(12) United States Patent
Latimer et al.

(10) Patent No.: US 8,387,545 B2
(45) Date of Patent: Mar. 5, 2013

(54) WATER RECOVERY FROM FLUE GAS IN STEAM-ASSISTED PRODUCTION

(75) Inventors: Edward G. Latimer, Ponca City, OK (US); Christopher R. Copeland, Bartlesville, OK (US); Ryan K. Davis, Bartlesville, OK (US); James Scinta, Bartlesville, OK (US); Dale L. Embry, Houston, TX (US); David C. Lamont, Bartlesville, OK (US); Charles J. Murray, Pasadena, TX (US); Ryan D. Donahe, Missouri City, TX (US)

(73) Assignee: ConocoPhillips Company, Houston, TX (US)

( * ) Notice: Subject to any disclaimer, the term of this patent is extended or adjusted under 35 U.S.C. 154(b) by 349 days.

(21) Appl. No.: 12/837,001

(22) Filed: Jul. 15, 2010

(65) Prior Publication Data

US 2011/0067610 A1    Mar. 24, 2011

Related U.S. Application Data

(60) Provisional application No. 61/226,510, filed on Jul. 17, 2009.

(51) Int. Cl.
*B01D 53/14* (2006.01)
*B01D 47/00* (2006.01)
(52) U.S. Cl. ............ 110/345; 110/342; 95/154; 95/211; 95/231; 95/235; 423/228
(58) Field of Classification Search .................. 110/215, 110/342, 345; 60/653, 679, 681; 166/266–267, 166/272.1, 272.3, 272.7, 303
See application file for complete search history.

(56) References Cited

U.S. PATENT DOCUMENTS

| | | | | |
|---|---|---|---|---|
| 3,999,329 A | * | 12/1976 | Brais | 47/17 |
| 4,035,282 A | * | 7/1977 | Stuchberry et al. | 208/391 |
| 4,208,383 A | * | 6/1980 | Kisters et al. | 423/215.5 |
| 4,487,139 A | * | 12/1984 | Warner | 110/345 |
| 4,799,941 A | * | 1/1989 | Westermark | 95/199 |
| 5,510,087 A | * | 4/1996 | Johnson et al. | 422/173 |
| 5,674,459 A | | 10/1997 | Gohara et al. | |
| 5,753,012 A | * | 5/1998 | Firnhaber et al. | 95/65 |
| 5,843,214 A | | 12/1998 | Janes | |
| 6,089,023 A | | 7/2000 | Anderson et al. | |
| 6,449,954 B2 | | 9/2002 | Bachmann | |
| 6,849,175 B2 | * | 2/2005 | Kresnyak | 208/187 |
| 7,022,296 B1 | * | 4/2006 | Khang et al. | 423/210 |
| 7,066,396 B2 | | 6/2006 | Knight et al. | |
| 7,194,869 B2 | * | 3/2007 | McQuiggan et al. | 62/238.3 |
| 7,341,102 B2 | * | 3/2008 | Kresnyak et al. | 166/267 |
| 7,390,353 B2 | * | 6/2008 | Deen et al. | 96/242 |
| 7,442,352 B2 | | 10/2008 | Lu et al. | |
| 7,690,201 B2 | * | 4/2010 | Kravets | 60/653 |
| 7,820,726 B2 | * | 10/2010 | Rigby et al. | 518/700 |
| 8,127,842 B2 | * | 3/2012 | Satchell et al. | 166/256 |
| 2002/0121360 A1 | * | 9/2002 | Curry | 165/111 |

\* cited by examiner

*Primary Examiner* — Duane Smith
*Assistant Examiner* — Ives Wu
(74) *Attorney, Agent, or Firm* — ConocoPhillips Company

(57) ABSTRACT

A method for introducing flue gas in a steam-assisted production facility into a vapor-liquid contactor. In this method the flue gas comprises boiler combustion products selected from at least one of commercial pipeline natural gas and produced gas. The flue gas is cooled with the vapor-liquid contactor to condense a portion of the water vapor in the flue gas to produce a water stream. The water stream is then recirculated and cooled in an air cooler to produce recirculating water exiting the bottom of the vapor-liquid contactor. A water slipstream is then taken off the recirculating water to be used as make-up water.

18 Claims, 3 Drawing Sheets

WATER RECOVERY FROM FLUE GAS IN STEAM-ASSISTED PRODUCTION

CROSS-REFERENCE TO RELATED APPLICATIONS

None

STATEMENT REGARDING FEDERALLY SPONSORED RESEARCH OR DEVELOPMENT

None

FIELD OF THE INVENTION

A method for generating make-up water by recovering water from flue gas in steam-assisted production.

BACKGROUND OF THE INVENTION

The make-up water supply for future steam-assisted production is an area of critical concern. There is an ecological push for fresh or "non-saline" water to not be used but instead to use saline water; however typically saline water contains a high amount of total dissolved solids. The costs associated with treating a water stream with a high amount of dissolved solids can be very expensive.

Water recovery by condensation from commercial-size boiler flue gas streams is an idea that has been discussed for quite some time. Many industrial processes produce process streams containing condensable components such as water vapor. As the mere discarding of these condensable components can constitute a substantial loss in available heat energy, it is desirable to recover these condensable components from the process streams for economic reasons. It is also desirable to recover the latent heat of vaporization associated with such condensable components as a means for reducing process energy requirements. The use of heat exchanger-based condensers for the recovery of condensable components of process streams and the latent heat of vaporization associated therewith is well known to those skilled in the art.

Methods and apparatuses for the selective removal of one or more components from a gaseous mixture are well known. U.S. Pat. No. 4,875,908 teaches a process for selectively separating water vapor from a multi-component gaseous mixture in which the multi-component gaseous mixture comprising the water vapor is passed along and in contact with a membrane which is selectively permeable to water vapor. The use of membranes for selective removal of one or more components of a gaseous mixture is also taught by U.S. Pat. No. 4,583,996 (inorganic porous membrane), U.S. Pat. No. 3,980,605 (fibrous semi-permeable membrane) and U.S. Pat. No. 3,735,559 (sulfonated polyxylylene oxide membranes).

Methods and apparatuses for selective removal of water vapor from a gaseous mixture and condensing the separated water vapor to recover its latent heat of vaporization are also known. U.S. Pat. No. 5,236,474 teaches a process for removing and recovering a condensable vapor from a gas stream by a membrane contactor in which a gas stream containing a condensable vapor is circulated on one side of hollow fiber membranes while cool extraction fluid is circulated on the other side under a total pressure differential. As a result, the condensable vapor in the gas stream is condensed in the gas stream and the condensed vapor, i.e. liquid, permeates the membrane and becomes entrained in the cool extraction fluid.

U.S. Pat. No. 4,466,202 teaches a process for recovery and reuse of heat contained in the wet exhaust gases emanating from a solids dryer or liquor concentrator by preferentially passing the vapor through a semi-permeable membrane, compressing the water or solvent vapor, and subsequently condensing the water or soluble vapor in a heat exchanger, thereby permitting recovery of its latent heat of vaporization for reuse in the evaporation process. It will be apparent to those skilled in the art that a substantial amount of energy will be required to compress the water or solvent vapor in accordance with the process of this patent. U.S. Pat. No. 5,071,451 teaches a vapor recovery system and process that permits condenser vent gas to be recirculated. The system includes a small auxiliary membrane module or set of modules installed across a pump and condenser on the downstream side of a main membrane unit, which module takes as its feed the vent gas from the condenser and returns a vapor-enriched stream upstream of the pump and condenser.

U.S. Pat. No. 7,066,396 teaches a heating system having a steam generator or water heater, at least one economizer, at least one condenser and at least one oxidant heater arranged in a manner so as to reduce the temperature and humidity of the exhaust gas stream and recover a major portion of the associated sensible and latent heat. The recovered heat is returned to the steam generator or water heater so as to increase the quantity of steam generated or water heated per quantity of fuel consumed. In addition, a portion of the water vapor produced by combustion of fuel is reclaimed for use as feed water, thereby reducing the make up water requirement for the system. However, U.S. Pat. No. 7,066,396 provides no teaching or suggestion of producing make-up water for a steam-assisted production system while cleaning and neutralizing the flue gas prior to the heat recovery.

U.S. Pat. No. 4,799,941 teaches a method for condensing flue gas in combustion plants, and an arrangement of the apparatus herefor. U.S. Pat. No. 4,799,941 attempts to condense flue gas in combustion plants by: (a) cooling and humidifying the flue gas by spraying water thereinto; (b) cooling and condensing water vapor from the flue gases in a first condensing stage, by indirect heat exchange with recirculated water, or return water, from a hot water circuit; (c) further cooling and condensing water vapor from the flue gases in a second condensing stage, by indirect heat exchange with water from a combustion air humidifier; and (d) heating and humidifying combustion air in the humidifier by direct contact with heated recirculated water from the second condensing stage. However, U.S. Pat. No. 4,799,941 provides no teaching or suggestion of producing make-up water during a steam-assisted production while cleaning and neutralizing the flue gas prior to the heat recovery.

SUMMARY OF THE INVENTION

The present embodiment depicts a method for introducing flue gas in a steam-assisted production facility into a vapor-liquid contactor. In this method the flue gas comprises boiler combustion products selected from at least one of commercial pipeline natural gas and produced gas. The flue gas is cooled with the vapor-liquid contactor to condense a portion of the water vapor in the flue gas to produce a water stream. The water stream is then recirculated and cooled in an air cooler to produce recirculating water exiting the bottom of the vapor-liquid contactor. A water slipstream is then taken off the recirculating water to be used as make-up water.

The present embodiment also depicts a steam-assisted gravity drainage production facility wherein a portion of the make-up water is produced from a flue gas. In this method the make up water is produced by first reducing the sulfur content of the flue gas chemically prior to combustion, wherein the fuel gas comprises boiler combustion products from commercial pipeline natural gas and/or produced gas. Flue gas is then introduced into a vapor-liquid contactor. The flue gas is cooled with the vapor-liquid contactor to condense a portion of the flue gas's water vapor to produce a water stream. The water stream is then recirculated and cooled exiting the bottom of the vapor-liquid contactor in an air cooler to produce recirculating water. The recirculating water is then neutralized with a neutralizing chemical. A water slipstream is then taken from the recirculating water to use as make-up water, wherein the make-up water produced has a pH compatible with the rest of facility water before going to the boiler.

The present embodiment also depicts a method of collecting production fluids from a steam-assisted gravity drainage operation. The production fluids are then separated into a produced gas stream, a produced oil stream and a produced water stream. The produced water stream is then transported to a boiler wherein the produced water stream is converted for use in the steam assisted gravity drainage operation. The produced gas stream is then transported to the boiler, wherein the produced gas stream is used as a fuel source. The flue gas from the boiler is then cooled in a vapor-liquid contactor with water to condense at least a portion of the water vapor in the flue gas. The condensed water vapor is then collected and transported to a boiler wherein the condensed water vapor is converted to steam for use in the steam assisted gravity drainage operation.

BRIEF DESCRIPTION OF THE DRAWINGS

The invention, together with further advantages thereof, may best be understood by reference to the following description taken in conjunction with the accompanying drawings.

DETAILED DESCRIPTION OF THE INVENTION

The description describes a method of introducing flue gas in a steam-assisted production facility, into a vapor-liquid contactor, wherein the boiler fuel gas comprises boiler combustion products selected from at least one of commercial pipeline gas and produced gas. The combusted flue gas is then cooled with recirculating water in the vapor-liquid contactor to condense a portion of the water vapor in the flue gas to produce a water stream. The water stream exits the bottom of the tower and is then recirculated and cooled in an air cooler to produce recirculating water. The water recovery method then continues by taking a water slipstream off the recirculating water to use as make-up water.

Examples of a vapor-liquid contactor include a spray tower, a tray tower, a packed tower, or any other conventionally known method of contacting gaseous vapor with a liquid.

Examples of steam-assisted production methods applicable to this method include steam-assisted gravity drainage, steam-assisted heavy oil production and cyclical steam stimulation.

The present method has the ability to produce a significant portion of the water used in the steam-assisted heavy oil production facility as make-up water, such as at least 10%, 15%, 20%, 25%, 30%, 35%, 40%, 45% or even 50% of that water depending on the water balance in the system. Both environmental and financial benefits can be achieved by recycling the water used in a steam-assisted production facility. It is also preferred that the recovered water produced from the flue gas is compatible with the make-up water in the rest of the facility. This could require pH adjustment to a range of 8-10 pH with neutralizing chemicals such as: sodium hydroxide, calcium hydroxide, potassium hydroxide, ammonia, ammonium hydroxide, sodium bicarbonate, and sodium carbonate. In alternate embodiments the neutralizing chemical would bring the pH to a target range of 3.0 to 7.0 or even between 3.0 and 4.5.

It is also preferred that the recirculating water used in the vapor-liquid contactor have an optimal pH that is high enough to avoid equipment damage by corrosion but low enough to avoid absorbing an excessive amount of $SO_2$ and $CO_2$. Values of optimal pH levels include 2.0, 2.5, 3.0, 3.5 and 4.0. Representative examples of neutralizing chemicals include: sodium hydroxide, calcium hydroxide, potassium hydroxide, ammonia, ammonium hydroxide, sodium bicarbonate, and sodium carbonate.

Figure 2:
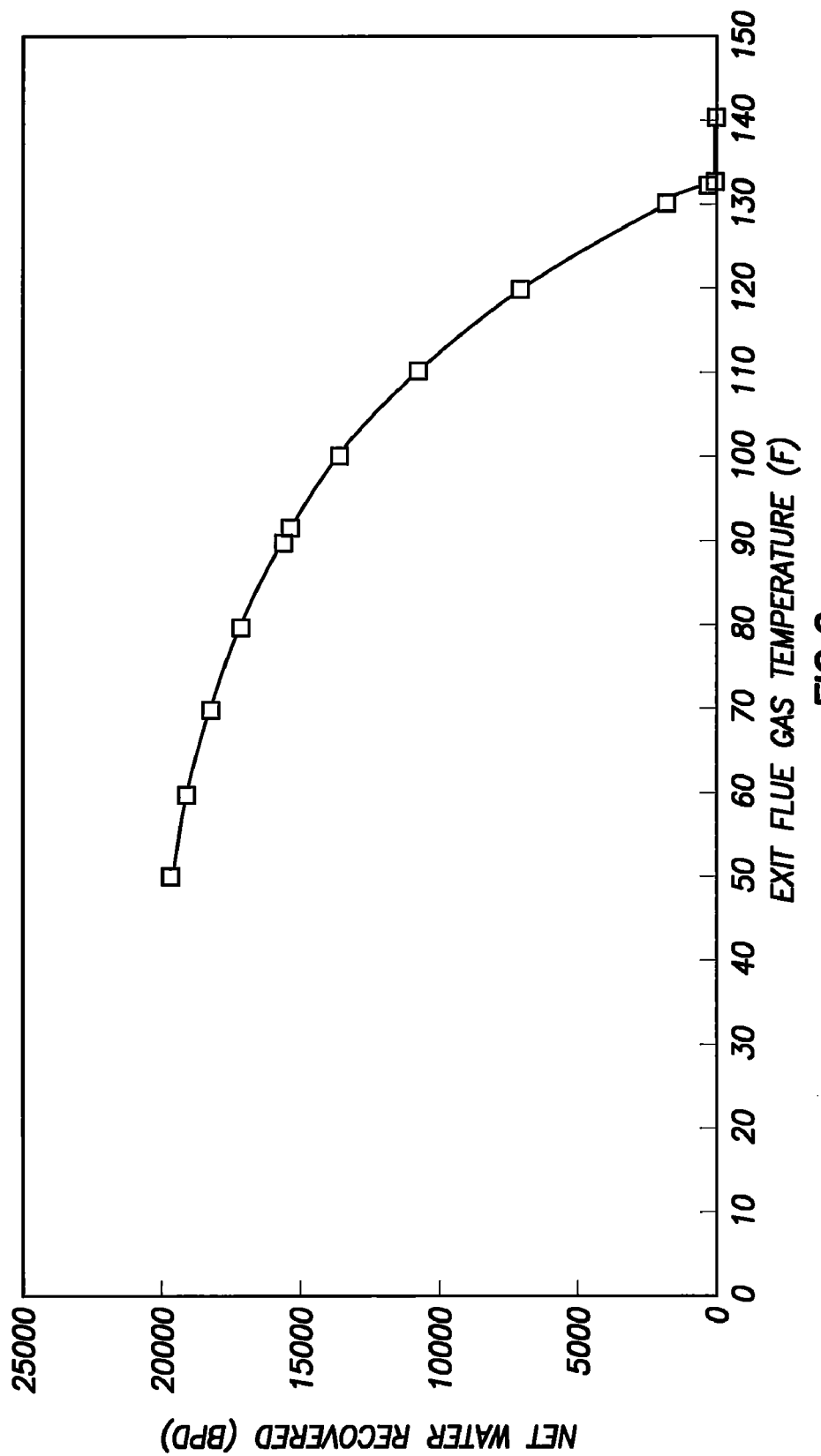
FIG. 2 depicts the relationship between flue gas temperature and net water recovery.
Figure 3:
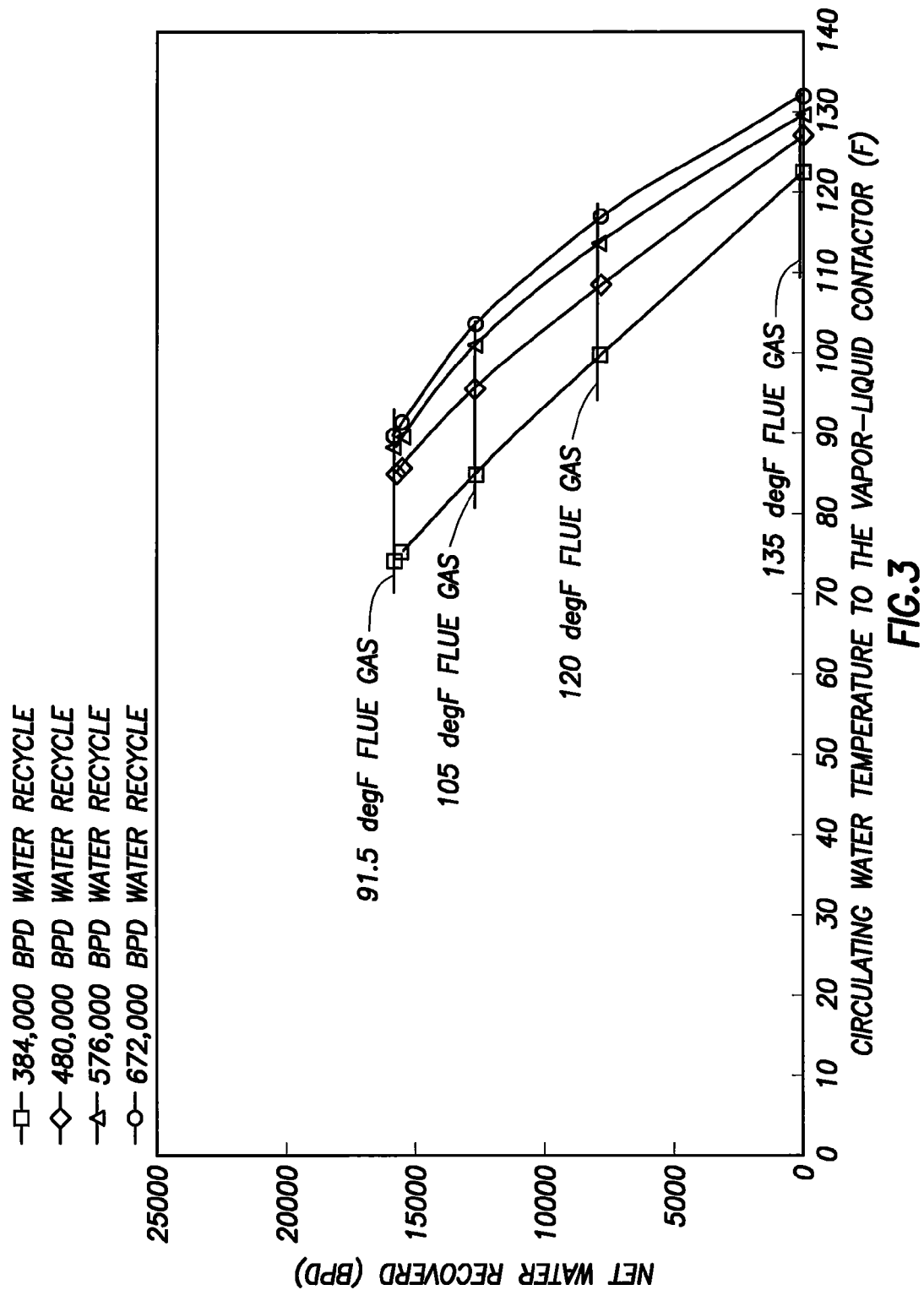
FIG. 3 depicts the relationship between flue gas temperature, water recirculation rate, and recirculating water temperature.

According to the present method the flue gas is cooled in a vapor-liquid contactor. During this step water colder than the flue gas is introduced into a vapor-liquid contactor, contacting the flue gas. The tower may or may not contain packing or other internals to enhance the contacting efficiency. A variety of tower packings would be sufficient for this invention and one skilled in the art would be able to determine a suitable packing. As the flue gas is cooled a portion of the water vapor in it condenses and mixes with the recirculating water and travels downward where it can be collected for recirculation. Typical conditions for this contact-cooling heat exchange operation include 300-400° F. inlet flue gas temperature from a boiler flue gas stack and an inlet water temperature below the flue gas water dew point, which is approximately 135° F. The temperature of the recirculating water needs to be sufficient to cool the flue gas to a temperature that will produce the desired recovered water production rate. FIG. 2 is an example of a graph that can be used to determine this flue gas temperature. Since the recirculating water is cooled in an air cooler and the cooling is affected by the ambient air temperature, the recirculating water temperature will vary throughout the year and hence the amount of water condensed from the flue gas will vary also. An example of the conditions necessary to produce 16,000 bpd of make-up water from the boilers of a steam-assisted production facility is depicted in FIG. 3. It shows that, for flue gas to be cooled to an exit temperature of 91.5° F. in a vapor-liquid contactor, a 480,000 bpd recirculating water stream must be cooled to 85° F. in an air-cooler. From an energy balance, the water stream exiting the bottom of the vapor-liquid contactor will be 145° F. Thus the air cooler must be sized to cool 480,000 bpd recirculating water from 145° F. to 85° F., potentially using ambient air, in order to produce 16,000 bpd of make-up water. Once the equipment has been sized and the recirculating water rate fixed, then the recirculating water temperatures, the flue gas temperature existing, the vapor-liquid contactor, and the produced make-up water can all be calculated versus various ambient air temperatures. It is an embodiment of this invention to optimize the equipment sizes and costs versus the desired steam-assisted production make-up water rate needed throughout the course of the year.

In one embodiment a neutralizing chemical is added to the recirculating water. One embodiment of using the neutralizing chemical utilizes hydroxides or other bases. Examples of bases that can be used as a neutralizing chemical include but are not limited to: sodium hydroxide, calcium hydroxide, potassium hydroxide and ammonium hydroxide, ammonia, sodium bicarbonate, and sodium carbonate.

The commercial pipeline gas and natural gas can vary depending on how much gas is produced in the steam-assisted production reservoir operation. Mixtures can be 0 to 100 vol % pipeline natural gas and 0 to 100 vol % produced gas. It is preferable to burn all the produced gas in order to lower the costs for purchasing a sufficient volume of pipeline natural gas to operate the boiler systems. A typical range of mixtures consists of 30 to 70 vol % produced gas.

In one embodiment the boiler flue gas has minimal sulfur content to reduce the corrosivity of the recirculating and recovered water. Minimal sulfur content can be achieved by any process currently known in the art. In one embodiment minimal sulfur content is achieved by chemically treating the flue gas prior to combustion. Examples of chemicals that can used to treat the flue gas include but are not limited to chemical additives, physical solvents and solid adsorbents. Representative examples of chemical solvents include amines such as monoethanolamine and methyldiethanolamine. Representative examples of physical solvents include methanol and dimethyl ethers of polyethylene glycol. Representative examples of solid absorbents include zinc oxide.

The practice of burning produced steam-assisted production reservoir gas is quite commonly done for economic reasons but can introduce more sulfur contaminant into the boiler fuel, which makes the flue gas stream more acidic and corrosive due to the presence of sulfur dioxide and sulfur trioxide. Because these latter two species can also be absorbed in water and make the recirculating water corrosive, this makes the condensation of flue gas water vapors from steam-assisted production boilers a unique application not practiced in the present art.

Another type of chemical additive that can be utilized is hydrogen peroxide. Hydrogen peroxide can be used to remove sulfur dioxide, nitrogen dioxide and other contaminants from flue gas. The use of hydrogen peroxide converts the oxide of sulfur and some of the oxide of nitrogen to more stable oxidation states. Acids formed as a result of this conversion, namely sulfuric acid ($H_2SO_4$) and nitric acid ($HNO_3$), can then be neutralized with base, such as limestone or $CaCO_3$, in an isolated area or enclosure away from populated areas. Other known ways to neutralize the acid include using gas desulfurization techniques such as wet lime treatment or wet $NaHCO_3$ treatment. Alternatively, depending on the demand and purity of the acid products themselves, the sulfuric and nitric acids can be collected and processed for sale as an industrial product, enhancing the economic feasibility of the present system. The following simplified chemical reactions represent the processes involved in both the creation of the contaminants and their removal through the use of hydrogen peroxide:

$$S + O_2 \leftrightarrow SO_2$$

$$N_2 + O_2 \leftrightarrow 2NO$$

$$2NO + O_2 \leftrightarrow 2NO_2$$

$$H_2O_2 + SO_2 \leftrightarrow H_2SO_4$$

$$H_2O_2 + 2NO_2 \rightarrow 2HNO_3$$

$$H_2SO_4 + H_2O + CaCO_3 \rightarrow CaSO_4 \cdot 2H_2O + CO_2$$

$$2HNO_3 + CaCO_3 \rightarrow Ca(NO_3)_2 + H_2O + CO_2$$

By reducing the sulfur species from the natural gas, the corrosivity of the recirculating water and the water slipstream will be reduced. In addition to the methods described above a method can be performed using a majority pipeline natural gas for specific steam-assisted production boilers. This will also reduce the sulfur impurities and reduce the corrosivity of the recovered water. A further reduction of sulfur can be achieved by using natural gas before it is odorized with sulfur compounds.

In another embodiment the combusted flue gas is pre-cooled with a water spray which is injected directly into the ducting before the vapor-liquid contactor to achieve a temperature above the water dew point of the flue gas, approximately 135° F., but below the condensation temperature of sulfur trioxide in flue gas, approximately 210-250° F., and preferably below the maximum working temperature limit of fiberglass reinforced plastic vessels. In this embodiment the water spray can contain a combusted flue gas neutralizing chemical. Representative examples of flue gas neutralizing chemicals include: sodium hydroxide, calcium hydroxide, potassium hydroxide, ammonia, ammonium hydroxide, sodium bicarbonate, and sodium carbonate.

In one embodiment the temperature of the flue gas would be 90° F. Although it is possible to still have recovery of water from flue gas anywhere from 50° F. up to 135° F., for operability and optimal size of the vapor-liquid contactor and air cooler it is ideal that the temperature of the flue gas would be between 80° F. to 110° F.

In yet another embodiment the present method provides instruction for a steam-assisted production facility wherein more than 50% of the steam-assisted production facility is obtained from make-up water produced from a boiler flue stack. In this embodiment the make-up water can be produced by first reducing the sulfur content of the boiler flue gas chemically prior to combustion, wherein the boiler fuel gas is selected from at least one of commercial pipeline natural gas and produced gas. The mixture can contain any known mixture of commercial pipeline gas and produced gas including 100% commercial pipeline gas and 100% produced gas. Next the combusted flue gas is introduced into a vapor-liquid contactor where it is cooled to condense a portion of the flue gas's water vapor to produce a water stream. In this embodiment the recirculating water from the vapor-liquid contactor contains a neutralizing chemical. The water stream exiting the bottom of the vapor-liquid contactor recirculates and cools the water stream in an air cooler to produce recirculated water. Finally the recovered water is taken off as a water slipstream of the recirculating water as to use as make-up water, wherein its pH is adjusted to be compatible with the rest of the water going to the boiler, which can range between 8.0-10.0 pH.

In one embodiment the vapor-liquid contactor can contain packing to enhance the contacting of the water and the flue gas. Different types of packing formats that can be used include: random packing with plastic such as polypropylene or metal such as stainless steel, or structured packing made of metal such as stainless steel. Key aspects of choosing an appropriate packing material include determining its ability to provide effective contacting of the flue gas and the recirculating water, being corrosion resistant to these process fluids, and having a low pressure drop to avoid having either larger fans or additional fans to move the flue gas through the vapor-liquid contactor and associated equipment.

In one embodiment the vapor-liquid contactor can be built directly into the flue gas stack which eliminates the need for piping or ducting and could lower the pressure drop such that a separate forced draft fan or blower is not required. If necessary the pressure necessary to move the flue gas through the vapor-liquid contactor could be obtained simply by increasing the size of the combustion air blower on the boiler, which is more economical than a separate blower or induced draft fan. If the vapor-liquid contactor is located directly inside the flue gas stack a collector plate would be placed at the bottom of the vapor-liquid contactor section to collect the exiting liquid water for removal. In this case the gas entry would be such that the gas can either pass upward through the plate either by 'chimneys' or holes in the plate, or by ducting the gas through a single large pipe penetrating the collector plate and existing above it or any other known method by one skilled in the art.

Figure 1:
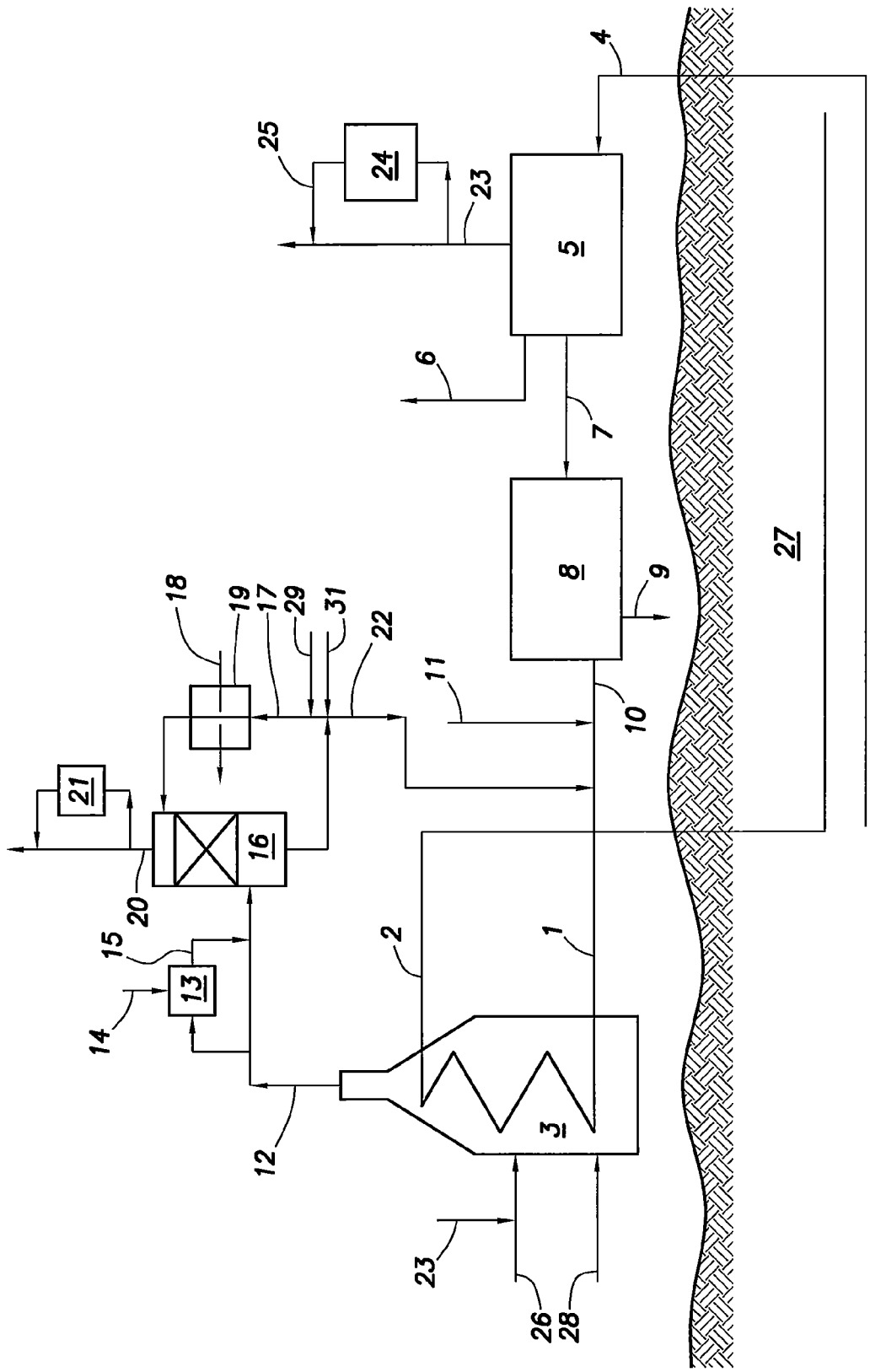
FIG. 1 depicts a steam-assisted production facility capable of recovering make-up water from flue gas.

FIG. 1 depicts an embodiment of the present invention for producing make-up water for a steam-assisted production facility from its flue gas. A water stream 1 is converted to steam 2 in a boiler system 3 which burns at least one of commercial pipeline natural gas, 26 and produced gas 23 with air 28. The produced gas 23 which is detailed further below, can be a combination of cleaned produced gas 25 or standard produced gas 23. The steam 2 is injected underground into a reservoir 27 and a product mixture 4 of bitumen, water and/or gas is collected at the surface. This product mixture 4 is sent to a separation facility 5 which separates the product mixture 4 into a bitumen 6 a water 7 and produced gas 23. The bitumen 6 may have diluent added to it in the separation facility 5 to assist in the separation. The water stream 7 is sent to a water treatment facility 8 to make it suitable for return to the boiler. Any combination of known processes can be used for this water treatment. Typically, a purge stream 9 that is high in contaminants, is removed during water treatment and to produce a make-up water stream 10 suitable for recycle to the boiler. To balance the loss of water in the purge stream 9 and elsewhere in the steam-assisted production system, additional water may be required. This is made up of any mixture of natural or conventional water resources stream 11 and/or recovered water stream 22 which is detailed further below. The combined make-up water streams 10, 11, and the water recovered from flue gas, stream 22, returns to the boiler system 3 as water stream 1.

The flue gas 12 exits the boiler system at approximately 300-400° F. and is normally vented to the atmosphere. The flue gas 12 may be pre-cooled by injecting a water stream 14 into the flue gas 12 via an injection device 13. This water stream may contain a flue gas neutralizing chemical. The resultant stream 15 would have a temperature below the condensation point of sulfuric acid in the flue gas or the acid gas dew point due to sulfur trioxide condensation in a system that contains water and preferably below the maximum working temperature of fiberglass reinforced plastic vessels, but above the water dew point of the flue gas, approximately 135° F. The flue gas 12 is sent to the vapor-liquid contactor 16, where it is cooled by the recirculating water stream introduced into the top. The recirculating water plus any condensed flue gas water exit the bottom of the vapor-liquid contactor and most of the water stream 17 is cooled in air cooler 19 using ambient air stream 18, before being sent back to the vapor-liquid contactor 16. A neutralizing chemical 29 may be added to increase the pH of the recirculating water stream to reduce the corrosion in the air cooler 19, the vapor-liquid contactor 16, and associated equipment and piping. The cooled flue gas 20 exits the top of the vapor-liquid contactor. The cooled flue gas 20 may have an induced draft fan or blower 21 to pull the cooled flue gas 20 through the equipment. Optionally a forced draft fan or blower may be used on the flue gas stream before the vapor-liquid contactor. A fan or blower may not be necessary in either location if the boiler system's fan which supplies air 28 provides adequate pressure. The recovered water stream 22 is taken from the water exiting the bottom of the vapor-liquid contactor and represents the additional make-up water that is added to the make-up water stream 10. To be compatible with stream 10 the pH of stream 22 may also need to be adjusted with a neutralizing chemical stream 31. This pH-adjusted recovered water stream can be used to reduce, if not eliminate the make-up water stream 11 derived from natural resources.

The produced gas 23 from the separation facility 5 is combustible and can be burned in the boiler 3. This produced gas stream can be used to reduce the amount of commercial pipeline natural gas, 26, used in the boiler. Because the produced gas 23 contains sulfur and other impurities the produced gas 23 may be sent to a gas treatment facility 24 to remove sulfur and other impurities resulting in cleaned produced gas 25 which can be sent to the boiler instead of or in addition to the produced gas 23. The use of the gas treatment facility 24 is capable of lowering emissions from the boiler system 3 in addition to reducing the corrosivity of the flue gas 12, the recovered water stream 22, and corrosion in equipment and its associated piping.

FIG. 2 depicts a graph describing the amount of make-up water that can be obtained from a 90,000 bpd steam-assisted production facility operating at a 2.5:1 steam:oil ratio with flue gas stream conditions of 960MMSCFD flue gas at 10.5 wt % $H_2O$, 14.1 psia and 300° F. It can be shown from this table that there is a correlation between the amount of water recovered and the temperature of the flue gas.

Using the example steam-assisted production facility from FIG. 1 it can be shown that approximately 225,000 bpd water are needed for the facility to operate (90,000 bpd oil X 2.5 steam/oil ratio=225,000 bpd water). Assuming a 93% recovery of the steam-assisted production water injected downhole means approximately 15,750 bpd of make-up water is needed to keep the steam-assisted production facility operations (225,000 bpd water needed X (1-0.93)=15,750 bpd make up water). In FIG. 2, when the flue gas is cooled to 91.5° F., 16,000 bpd of make-up water can be recovered from the flue gas. Therefore under ideal conditions it is possible that completely all of the make-up water needed in a steam-assisted production facility can be supplied by the present method. Cooling the flue gas below 91.5° F., such as when the ambient air temperature is below the design temperature, produces an excess of recovered water stream 22, while cooling the flue gas above 91.5° F. with warmer ambient air temperatures produces a good portion of the make-up water.

FIG. 3 depicts a graph showing the effects of higher water recirculation flow with flue gas stream conditions of 960MMSCFD flue gas at 10.5 wt % $H_2O$, 14.1 psia and 300° F. Higher recirculation rates allow for a higher recirculating water temperature and less vapor-liquid contactor length or, if used, less vapor-liquid contactor packing material to achieve the same flue gas exit temperature and hence the same produced make-up water rate as per FIG. 2, but increases the size of the recirculation equipment. For the case of 91.5° F. flue gas where the produced make-up water balances the needs of the steam-assisted production facility at 93% recovery, FIG. 3 shows that increasing the water recirculation rate from 384,000 bpd to 480,000 bpd allows the required water temperature to be 10° F. higher and this substantially reduces the size and cost of the air cooler required. Higher recirculation rates above 480,000 bpd did little to increase the required water cooling temperature further and hence 480,000 bpd recirculation rate is considered the minimum. In this embodiment the ratio of minimum water recirculation to make-up water is 480,000:16,000, or 30:1 for the balanced steam-assisted production water case at 91.5° F. flue gas. Different embodiments would alter the lower end of the optimal region and accordingly change the minimum water recirculation to make-up water.

The preferred embodiment of the present invention has been disclosed and illustrated. However, the invention is intended to be as broad as defined in the claims below. Those skilled in the art may be able to study the preferred embodiments and identify other ways to practice the invention that are not exactly as described herein. It is the intent of the inventors that variations and equivalents of the invention are within the scope of the claims below and the description, abstract and drawings are not to be used to limit the scope of the invention.

The invention claimed is:

1. A method comprising:
    a) introducing flue gas in a steam-assisted production facility into a vapor-liquid contactor, wherein the flue gas comprises boiler combustion products selected from at least one of commercial pipeline natural gas and produced gas;
    b) cooling the flue gas with the vapor-liquid contactor to condense a portion of the water vapor in the flue gas to produce a water stream;
    c) recirculating and cooling the water stream exiting the bottom of the vapor-liquid contactor in an air cooler to produce recirculating water, wherein the vapor-liquid contactor uses the recirculating water and flow rate of the recirculating water relative to flow rate of make-up water is a ratio of at least 30:1; and
    d) recovering water from flue gas by taking a water slipstream off of the recirculating water to be used as the make-up water.

2. The method of claim 1, wherein the pH of the water slipstream is adjusted prior to being used as make-up water.

3. The method of claim 1, wherein a neutralizing chemical is added to the recirculating water.

4. The method of claim 3, wherein the neutralizing chemical is selected from the group consisting of: sodium hydroxide, calcium hydroxide, potassium hydroxide, ammonia, ammonium hydroxide, sodium bicarbonate, and sodium carbonate.

5. The method of claim 3, wherein the neutralizing chemical added brings the pH of the recirculating water to above 3.0.

6. The method of claim 1, wherein the vapor-liquid contactor is built directly into the flue gas stack.

7. The method of claim 1, wherein the vapor-liquid contactor has packing material in it to enhance the contact of the flue gas and recirculating water.

8. The method of claim 1, wherein the flue gas has minimal sulfur content.

9. The method of claim 8, wherein the flue gas with minimal sulfur content is achieved by chemically treating the produced gas prior to combustion.

10. The method of claim 9, wherein the produced gas is treated with at least one chemical comprising of: chemical additives, physical solvents and solid adsorbents.

11. The method of claim 10, wherein the chemical additive is selected from the group consisting of: monoethanolamine and methyldiethanolamine.

12. The method of claim 10, wherein the physical additive is selected from the group consisting of methanol and dimethyl ethers of polyethylene glycol.

13. The method of claim 10, wherein the solid absorbent is selected from the group consisting of zinc oxide.

14. The method of claim 1, wherein the flue gas is pre-cooled with a water spray injected directly into the ducting before the vapor-liquid contactor to achieve a temperature above the water dew point of the flue gas but below the condensation temperature of sulfur trioxide in flue gas and below the working temperature limit of fiberglass reinforced plastic vessels.

15. The method of claim 1, wherein more than 50% of the water used in the steam-assisted production facility is make-up water.

16. The method of claim 1, wherein the make-up water produced has a pH compatible with the rest of the facility water before going to the boiler.

17. A steam-assisted gravity drainage production facility wherein a portion of the make-up water is produced from a flue gas, wherein the make-up water is produced by:
    a) reducing the sulfur content of the flue gas chemically prior to combustion, wherein the fuel gas comprises boiler combustion products selected from at least one of commercial pipeline natural gas and produced gas;
    b) introducing the flue gas into a vapor-liquid contactor;
    c) cooling the flue gas with the vapor-liquid contactor to condense a portion of the flue gas's water vapor to produce a water stream,
    d) recirculating and cooling the water stream exiting the bottom of the vapor-liquid contactor in an air cooler to produce recirculating water, wherein the vapor-liquid contactor uses the recirculating water and flow rate of the recirculating water relative to flow rate of make-up water is a ratio of at least 30:1;
    e) neutralizing the recirculating water with a neutralizing chemical, and
    f) recovering water from flue gas by taking a water slipstream from the recirculating water to use as the make-up water, wherein the make-up water produced has a pH compatible with the rest of facility water before going to a boiler.

18. A method comprising:
    a) collecting production fluids from a steam assisted gravity drainage operation;
    b) separating the production fluids into a produced gas stream, a produced oil stream and a produced water stream;
    c) transporting the produced water stream to a boiler wherein the produced water stream is converted for use in the steam assisted gravity drainage operation;
    d) transporting the produced gas stream to the boiler, wherein the produced gas stream is used as a fuel source;
    e) cooling the flue gas from the boiler in a vapor-liquid contactor with recirculating water to condense at least a portion of the water vapor in the flue gas, wherein the vapor-liquid contactor uses the recirculating water and flow rate of the recirculating water relative to flow rate of the condensed water transported to a boiler is a ratio of at least 30:1; and
    f) recovering the condensed water vapor and transporting the condensed water vapor to the boiler wherein the condensed water vapor is converted to use in the steam assisted gravity drainage operation.

* * * * *